United States Patent [19]

Spence

[11] 4,196,253

[45] Apr. 1, 1980

[54] PAPER COATED WITH BINDER AND ORGANIC PIGMENT PARTICLES

[75] Inventor: Gavin G. Spence, New Castle County, Del.

[73] Assignee: Hercules Incorporated, Wilmington, Del.

[21] Appl. No.: 906,898

[22] Filed: May 18, 1978

Related U.S. Application Data

[63] Continuation-in-part of Ser. No. 835,570, Sep. 22, 1977, abandoned.

[51] Int. Cl.² ............................................. B32B 5/16
[52] U.S. Cl. ................................... 428/323; 428/407; 428/478; 428/512; 428/514; 428/516; 428/517; 428/518; 428/519; 428/520; 428/521; 428/522; 260/29.6 RB; 260/29.6 T
[58] Field of Search ............... 428/407, 478, 512, 514, 428/516–522, 323; 260/29.6

[56] References Cited

U.S. PATENT DOCUMENTS

| | | | |
|---|---|---|---|
| 3,365,410 | 1/1968 | Wesslau et al. | 428/514 X |
| 3,595,823 | 7/1971 | Huang | 260/29.6 T |
| 3,779,800 | 12/1973 | Heiser | 260/29.6 RB X |
| 3,819,557 | 6/1974 | Loeffler et al. | 260/29.6 TA |
| 3,968,319 | 7/1976 | Mani et al. | 428/511 |
| 4,056,501 | 11/1977 | Gibbs et al. | 260/29.6 SQ |

*Primary Examiner*—P. C. Ives

[57] ABSTRACT

Disclosed are (1) coated paper comprising a paper substrate having adhered to at least one surface thereof a coating composition comprised of a binder material and an organic pigment, and (2) a paper product comprised of cellulosic fibers and an organic pigment, the organic pigment being essentially uniformly dispersed throughout the paper product. The organic pigments employed are finely divided particles obtained by graft copolymerizing an ethylenically unsaturated monomer, such as styrene, and a water-soluble nonionic or anionic prepolymer in aqueous media and in the presence of a free-radical polymerization initiator.

26 Claims, No Drawings

PAPER COATED WITH BINDER AND ORGANIC PIGMENT PARTICLES

This application is a continuation-in-part of application Ser. No. 835,570, filed Sept. 22, 1977 now abandoned.

This invention relates to novel organic pigments adapted particularly for use in paper coatings.

Paper and other cellulosic substrates are often coated to improve appearance and printability. The coatings usually comprise an inorganic pigment such as clay, calcium carbonate, or titanium dioxide and a binder which binds the pigment particles to the substrate. The applied coating provides a smooth, ink-receptive surface suitable for printing. In addition, the inorganic pigment particles scatter light, opacify and brighten the coated substrate.

Recently, polymer particles, such as finely divided particles of polystyrene, have been used as replacements or partial replacements for inorganic pigments in paper coatings. These polymer particles are referred to in the art as "organic pigments".

In accordance with this invention, there are provided graft copolymer particles having a particle size and other properties that make them highly desirable as organic pigments for use in paper coatings.

The organic pigments of this invention are prepared by graft copolymerizing, in aqueous media, at least one monoethylenically unsaturated monomer, to be detailed hereafter, onto a water-soluble anionic or nonionic prepolymer.

In carrying out this invention, an aqueous solution of the water-soluble prepolymer, which can be either an anionic prepolymer or a nonionic prepolymer, is first prepared. The prepolymers can be homopolymers or copolymers of two or more monomers. These polymers will be detailed more fully hereinafter. To the aqueous solution of the prepolymer are added a free-radical polymerization initiator and the desired monoethylenically unsaturated monomer and free radical graft copolymerization is carried out at a temperature of from about 40° C. to about 90° C. The exact temperature employed during graft copolymerization is within the skill of the art and will depend on the initiator and the monomer employed. A highly stable latex is produced. In some instances, the water can be removed, if desired, as by drying, to provide free-flowing graft copolymer particles.

The initial function of the water-soluble anionic or non-ionic prepolymer is to stabilize the suspension and prevent coagulation of the individual particles. After initial graft copolymerization is effected, some homopolymerization of the monomer may occur inside the particle. A substantial portion of the anionic or nonionic prepolymer will be grafted onto the surface of the graft copolymer particles. Essentially stable latexes of the graft copolymer particles are prepared in accordance with this invention without requiring the presence of an additional stabilizer.

The water-soluble anionic and nonionic prepolymers used in this invention can be those prepared by the addition polymerization of vinyl monomers and mixtures thereof and are well-known in the art of water-soluble addition-type polymers. Examples of nonionic monomer α,β-ethylenically unsaturated amides such as acrylamide, methacrylamide, N,N-dimethylacrylamide, N-methylacrylamide, N-methylolacrylamide, and diacetone acrylamide. Other suitable nonionic monomers are hydroxyethyl acrylate, hydroxypropylacrylate, hydroxyethyl methacrylate, hydroxypropyl methacrylate, and N-vinylpyrrolidone. Monomers that can be used to prepare anionic prepolymers are α,β-ethylenically unsaturated mono- and polycarboxylic acids such as acrylic acid, methacrylic acid, itaconic acid, maleic acid and fumaric acid. Other suitable monomers that can be used to prepare anionic prepolymers are vinyl sulfonic acid, allyl sulfonic acid, styrene sulfonic acid, and 2-sulfoethyl methacrylate.

Nonionic prepolymers include homopolymers and copolymers of the above nonionic monomers such, for example, as polyacrylamide, the homopolymer of acrylamide; polymethacrylamide, the homopolymer of methacrylamide; a copolymer of acrylamide and hydroxyethylacrylate; a copolymer of methacrylamide and hydroxypropyl acrylate; and a copolymer of acrylamide and hydroxyethyl methacrylate.

Other suitable water-soluble nonionic polymers that can be used in this invention are poly(vinyl alcohol) and poly(ethylene oxide).

Examples of anionic prepolymers are copolymers of acrylamide and acrylic acid; copolymers of methacrylamide and acrylic acid; copolymers of acrylamide and methacrylic acid; and copolymers of methacrylamide and methacrylic acid. As is evident to those skilled in the art, these prepolymers are only anionic in their neutralized form. Thus, to take advantage of the anionic properties, it is necessary to use these prepolymers in neutralized form. This presents no problem when the organic pigments prepared from these anionic prepolymers are used in paper coating since paper coating processes are usually carried out at an alkaline pH.

Other suitable water-soluble polymers are the naturally occurring polymers such as starch (nonionic); the nonionic and anionic derivatives of starch; and those naturally occurring polymers made water-soluble by derivatization such as hydroxyethyl cellulose (nonionic) and the sodium salt of carboxymethyl cellulose (anionic).

Water-soluble anionic and nonionic prepolymers are easily and readily prepared by adding, simultaneously, the desired monomers, in the desired amounts, and a water-soluble, free-radical polymerization initiator, each in aqueous solution, to a reaction vessel containing water maintained at a temperature of about 80° C. to about 90° C. Suitable free-radical polymerization initiators are those employed in preparing the graft copolymer particles of this invention and are set forth hereafter. The amounts of initiator employed will be that amount sufficient to provide water-soluble prepolymers having an RSV (Reduced Specific Viscosity) of from about 0.1 to about 2.5, preferably from about 0.1 to about 1, measured as a 1% solution in 1 M NaCl at 25° C., (1 M NaCl, 1%, 25° C.) or an RSV of from about 0.1 to about 2.5, preferably from about 0.15 to about 1, measured as a 1% solution in 0.1 M NaCl at 25° C., (0.1 M NaCl, 1%, 25° C.).

There are two main requirements for the graft copolymer particles prepared in accordance with this invention. They must be (1) water-insoluble and (2) have a high enough melting or softening point that they will not be deformed to any substantial degree under the conditions of heat or pressure or both to which they will be subjected in use. Preferably, the graft copolymer will have a second order transition temperature (glass transition temperature, $T_g$) equal to or greater than 75° C.

Any monomer that will graft copolymerize with the water-soluble prepolymers, hereinafter described, to provide graft copolymer particles meeting the above requirements can be employed in this invention. Suitable monomers are monoethylenically unsaturated monomers such, for example, as acrylic esters such as methyl α-chloroacrylate and ethyl α-chloroacrylate; methacrylic esters such as methyl methacrylate, isopropyl methacrylate, and phenyl methacrylate; and monomers having the formula

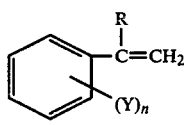

where R is hydrogen or methyl, Y is methyl or chorine and n is 0, 1, 2, or 3. Examples of such monomers are styrene, α-methyl styrene, monochlorostyrene, dichlorostyrene, trichlorostyrene, monomethyl styrene, dimethylstyrene, and trimethylstyrene. Other suitable monomers are vinyl chloride, acrylonitrile, and methacrylonitrile.

Mixtures of two or more monoethylenically unsaturated monomers can be used in carrying out this invention provided the resulting graft copolymer particles are water-insoluble and having a $T_g$ equal to or greater than 75° C. Also, polyethylenically unsaturated monomers, such as divinylbenzene; trivinylbenzene; divinylnaphthalene; diallyl phthalate; ethylene glycol dimethacrylate; 1,3-butylene glycol dimethacrylate; 1,6-hexanediol dimethacrylate; polyethylene glycol dimethacrylate; polypropylene glycol dimethacrylate; diallyl maleate; diallyl fumarate; trimethylol propane trimethacrylate; pentaerythritol tetraacrylate; and mixtures of two or more can be used in admixture with monoethylenically unsaturated monomers to provide crosslinked graft copolymer particles.

Of the above listed monoethylenically unsaturated monomers, styrene, vinyl chloride, acrylonitrile, and methylmethacrylate are preferred.

Of the above listed polyethylenically unsaturated monomers, divinylbenzene; diallyl phthalate; ethylene glycol dimethacrylate; and 1,3-butylene glycol dimethylacrylate are preferred.

In some cases it is desirable that the prepolymer moiety of the graft copolymer particles contain a group that is reactive. Such reactivity will usually increase the bonding properties of the particles to one another and to the surface to which they are applied.

Reactive groups can be introduced into some monomers prior to preparation of a prepolymer, they can be introduced into a prepolymer after preparation thereof, or they can be introduced into the graft copolymer particles after preparation thereof.

Reactive groups can be introduced by means of an aldehyde such as formaldehyde, glyoxal, and glutaraldehyde with monomers containing amide functionality such as acrylamide and monomers containing hydroxyl groups such as hydroxyethyl acrylate, and with prepolymers containing amide functionality such as poly(acrylamide), or hydroxyl groups such as poly(vinyl alcohol). Using dialdehydes, such as glyoxal, the reactive group will be an aldehyde. Using formaldehyde, the reactive group will be the N-methylol group.

The amount of aldehyde employed to provide graft copolymer particles with adequate reactive groups will be about 0.25 mole to about 3 moles, preferably about 1 mole to about 2 moles, for each mole of amide or hydroxyl functionality. Reaction will be carried out at a temperature of from about 20° C. to about 60° C. at a pH of about 8 to 10 except when formaldehyde is used as the aldehyde, reaction is carried out at a pH of from about 2 to 3.

The presence of reactive groups on the surface of the particles of this invention improves adhesion by reactions between particles or between particle and substrate.

The amount of water-soluble prepolymer used in preparing the graft copolymers in accordance with this invention can vary from about 1 part to about 25 parts based on 100 parts of monomer or monomer mixture. The preferred range is from about 2 to 10 parts per 100 parts of monomer or monomer mixture.

As above set forth, graft copolymerization is carried out by adding the graft copolymerizable monomer to a solution of water-soluble prepolymers in the presence of a polymerization initiator. The prepolymer can be present in the reaction vessel initially, or it can be added simultaneously with the monomers. The polymerization initiator is usually added continuously along with the monomer.

A wide variety of chemical polymerization initiators can be used to prepare the latexes of this invention, with peroxy compounds being particularly useful. The initial stage of the polymerization involves formation of a graft copolymer between the monomer and the water-soluble prepolymer. The initiator presumably first introduces free radical sites onto the prepolymer. Addition of monomer to these sites then leads to the desired graft copolymer particles.

Suitable water-soluble initiators include those activated by heat, such as sodium persulfate and ammonium persulfate. Polymerizations carried out with these initiators are generally run at temperatures of 70°-95° C. Other water-soluble initiators that are suitable include the so-called redox initiator systems such as ammonium persulfate-sodium bisulfite-ferrous ion and t-butyl hydroperoxide-sodium formaldehyde sulfoxylate. Redox intiators are activated at relatively low temperatures, and polymerizations employing these systems can be carried out at temperatures from about 20° C. to 80° C.

The amount of initiator employed is within the skill of the art. Usually, about 0.1 part to about 5 parts of initiator will be employed for each 100 parts of monomer used.

In this specification and in the examples all parts and percentages are by weight unless otherwise specified.

EXAMPLE 1A

The prepolymer used in this example was a 92% acrylamide-8% acrylic acid copolymer. The Brookfield viscosity of a 12.5% solution of the prepolymer in water was 1286 centipoises measured at 26° C.

A twelve-liter reaction vessel was fitted with a stirrer, a thermometer, a condenser and three addition funnels. The reaction vessel was charged with 2250 grams distilled water. One funnel was charged with 3500 grams styrene, one funnel was charged with 80 grams ammonium persulfate dissolved in 400 grams distilled water, and one funnel was charged with 2200 grams of an 8% aqueous solution of the above prepolymer. The water in the reaction vessel was heated to 78°

C. The contents of the three funnels were added, dropwise, to the reaction vessel over a period of about 3 hours. During this time, the contents of the reaction vessel were maintained at a temperature of from 80°–95° C. The resulting latex, 46.8% solids, was cooled to room temperature (about 25° C.).

EXAMPLE 1B

Example 1A was repeated with the following exceptions: the prepolymer solution used was 2400 grams of a 7.3% aqueous solution thereof; the ammonium persulfate solution consisted of 60 grams of ammonium persulfate dissolved in 250 grams distilled water; and the resulting latex was diluted with 1100 grams distilled water to provide a latex having a solids content of 39.5%.

EXAMPLE 1C

Example 1B was repeated with the following exceptions: the initial charge of distilled water to the reaction vessel was 3150 grams instead of 2250 grams and the ammonium persulfate solution consisted of 48 grams ammonium persulfate dissolved in 200 grams distilled water. In this example no additional water was added to the prepared latex as in Example 1B. The prepared latex had a solids content of 39.6%.

EXAMPLE 1D

Example 1C was repeated with the following exception: the ammonium persulfate solution consisted of 46.4 grams ammonium persulfate in 210 grams distilled water. The prepared latex had a solids content of 41%.

EXAMPLE 1E

Example 1C was repeated with the following exception: the ammonium persulfate solution consisted of 38.4 grams ammonium persulfate in 160 grams distilled water. The prepared latex had a solids content of 41%.

EXAMPLE 2A

The latexes of Examples 1A, 1B, 1C, 1D, and 1E were combined and a coating color was prepared from a portion thereof. To a vessel equipped with a high-shear agitation were added, with constant high-shear agitation, 26.5 kilograms of a 70% aqueous suspension of a clay pigment available commercially under the proprietary designation Ultrawhite 90; 6.8 kilograms of a 2% aqueous solution of a water-soluble medium viscosity sodium carboxymethyl cellulose (degree of substitution, about 0.9), and 15.5 kilograms of a 47 polyvinyl acetate latex binder. The pH of this resulting mixture was adjusted to 8.8 with concentrated NH4OH. 11.1 kilograms of the combined latexes of Examples 1A–1E were added, with high shear agitation. The pH was then adjusted to 8.5 with concentrated NH4OH. The total solids content of the resulting coating color was 56.4%. This is identified as Coating Color 3.

EXAMPLE 2B

Example 2A was repeated with the following exceptions: 11.6 kilograms of polyvinyl acetate latex binder was used instead of 15.5 kilograms and 0.8 kilograms additional water was included to provide a coating color having a solids content of 55.7%. This is identified as Coating Color 4.

EXAMPLE 2C

Example 2A was repeated with the following exceptions: 7.7 kilograms of polyvinyl acetate latex binder was used instead of 15.5 kilograms and 1.5 kilograms additional water was included to provide a coating color having a solids content of 56.9%. This is identified as Coating Color 5.

EXAMPLE 2D

To a vessel equipped with a high shear agitator were added, with constant high shear agitation, 64.8 kilograms of an aqueous clay suspension as used in Example 2A; 4.6 kilograms water; 6.8 kilograms of a 2% aqueous solution of sodium carboxymethyl cellulose as used in Example 2A; and 15.5 kilograms of a 47% polyvinyl acetate latex binder as used in Example 2A. The pH of the resulting mixture was adjusted to 8.5 with concentrated NH4OH. This coating color, identified as Coating Color 1, had a solids content of 55.8%.

EXAMPLE 2E

Example 2D was repeated with the following exceptions: the amount of aqueous clay suspension added was 58.3 kilograms; the amount of water added was 1.6 kilograms; the amount of polyvinyl acetate latex binder added was 15.5 kilograms; and there was also added to this mixture 9.4 kilograms of a 48% aqueous dispersion of polystyrene organic pigment. This coating color, identified as Coating Color 2, had a solids content of 55.9%.

Table I below sets forth the pigment, sodium carboxymethyl cellulose and binder composition of the above coating colors.

TABLE I

| Coating Color | Pigments (parts by weight) | | | Polyvinyl Acetate Binder (parts by weight) | CMC[1] (parts by weight) |
| --- | --- | --- | --- | --- | --- |
| | Clay | Polystyrene | Example 1A–1E | | |
| 1 | 100 | — | — | 16 | 0.3 |
| 2 | 90 | 10 | — | 16 | 0.3 |
| 3 | 90 | — | 10 | 16 | 0.3 |
| 4 | 90 | — | 10 | 12 | 0.3 |
| 5 | 90 | — | 10 | 8 | 0.3 |

[1]Sodium carboxymethyl cellulose - used as a viscosity increasing additive.

Each coating color was applied to commercially available 50-lb. paper basestock using the blade coater of a pilot coating machine. Various tests were made on the coated paper basestock. Smoothness, opacity, and brightness tests were made on uncalendered coated paper. All other tests were made on coated paper sheets that had been calendered by passing the coated paper through a heated calender (71° C.) 4 times (4 nips) at 1500 pli. These tests and the results are set forth in Table II below.

TABLE II

| Coating Color | Coat Weight (lb/3000 ft[2]) | Sheffield Smoothness[1] | Opacity[2] | Brightness Original[3] | Brightness K&N[4] | 75° Specular Gloss[5] calendered, 4 nips at 71° C. 500 pli | 1000 pli | 1500 pli | 2000 pli[6] | Ink Set-off[7] (density) 30 sec | 60 sec | 90 sec | Water Dissipation[8] (Density) | IGT Pick Feet per Minute[9] |
|---|---|---|---|---|---|---|---|---|---|---|---|---|---|---|
| 1 | 5.0 | 23 | 88.1 | 85.7 | 55.8 | 49.5 | 58.8 | 63.7 | 69.0 | 0.88 | 0.73 | 0.63 | 1.58 | 197 |
| 2 | 4.8 | 21 | 88.5 | 86.0 | 54.9 | 61.8 | 73.7 | 78.8 | 79.7 | 0.78 | 0.63 | 0.54 | 1.61 | 236 |
| 3 | 4.0 | 26 | 87.3 | 85.8 | 55.7 | 48.3 | 62.2 | 69.2 | 71.5 | 0.82 | 0.66 | 0.58 | 1.44 | 276 |
| 4 | 4.6 | 29 | 86.9 | 86.2 | 53.1 | 52.5 | 63.0 | 68.5 | 71.3 | 0.66 | 0.54 | 0.47 | 0.61 | 236 |
| 5 | 4.5 | 31 | 87.7 | 86.2 | 51.6 | 56.2 | 65.8 | 71.2 | 73.5 | 0.56 | 0.39 | 0.34 | 1.69 | 177 |

[1]TAPPI Standard UM-518 (Average of 5 tests)
[2]TAPPI Standard T-425, Hunter Opacity Meter (Average of 5 tests)
[3]TAPPI Standard T-452 (Average of 6 tests)
[4]TAPPI Standard UM-553 (Average of 2 tests)
[5]TAPPI Standard T-480 (Average of 12 tests)
[6]pli = pounds per linear inch
[7]Jansen, F.B., "Application of the IGT-Paintability Tester", 3rd revised edition, IGT Monograph 12, Amsterdam, Stichting Institute Voor Grefische Techniek TNO, 1972, p. 14, IPI No. 3 tack rated ink employed (Average of 3 tests)
[8]Parsons, C.L., TAPPI, 58(5), 123 (1975) - Apparatus operated at a constant speed of 2m/sec. and at a nip pressure of 40 kgf. Inmont jet halftone black ink used (Average of 3 tests)
[9]TAPPI Standard T-499 (No. 24 tack polybutene oil used instead of tack graded ink - test temperature 72° F.) (Average of 3 tests)

EXAMPLE 3

A water-jacketed, one-liter resin kettle was fitted with a stirrer, a thermometer, a condenser and three addition funnels. One funnel was charged with a solution of 97.5 grams acrylamide dissolved in 390 grams distilled water, the second funnel was charged with a solution of 2.5 grams of acrylic acid dissolved in 10 grams distilled water, and the third funnel was charged with 2.5 grams of ammonium persulfate dissolved in 47.5 grams distilled water. The resin kettle was charged with 117 grams distilled water and heated to 85°-87° C. under nitrogen sparge. The contents of the three funnels were added, dropwise, to the resin kettle over a period of 2¾ hours to provide a prepolymer solution. The prepolymer was a 97.5% acrylamide-2.5% acrylic acid copolymer. The RSV of the prepolymer was 0.34 (0.1 M NaCl, 1%, 25° C.). When measured as a 1% solution in 1 M NaCl at 25° C. (1 M NaCl, 1% 25° C.), the prepolymer had an RSV of 0.29. The prepolymer solution had a solids content of 15.8% by weight. This prepolymer was diluted with distilled water to a 10% solids content.

A water-jacketed, one-liter resin kettle was fitted with a stirrer, a thermometer, a condenser and two addition funnels. The kettle was charged with 163 grams of the above 10% prepolymer solution and 326 grams distilled water. One funnel was charged with 327 grams styrene and the other with 8.6 grams ammonium persulfate dissolved in 34.5 grams distilled water. The kettle contents were heated to 85° C. by circulating hot water in the jacket. The contents of the two funnels were added, dropwise, to the resin kettle over a period of 2½ hours. After addition was complete, the contents of the resin kettle were stirred for 15 minutes at 89°-91° C., followed by cooling to room temperature. The resulting latex was filtered through a 100-mesh sieve. The resulting latex contained a small amount of aggregate and to break up the aggregate, the latex was passed through a hand homogenizer. The latex had a solids content of 41% and the particles had a particle size of 0.6 micron. Particle size was estimated from turbidity reading according to the method of A. B. Loebel (Official Digest, 200, February, 1959). The latex was mixed with an amount of glyoxal that was the molar equivalent to the amount of acrylamide used in the preparation of the prepolymer.

EXAMPLE 4

Three coating colors were prepared. These coating colors are identified as Coating Colors 6, 7, and 8. These coating colors were prepared by thoroughly admixing, by high shear agitation, the components shown in Table III. pH adjustments are also shown in the Table. In the Table, g. means grams.

TABLE III

| Coating Color | 6 | 7 | 8 |
|---|---|---|---|
| Example 3 latex composition | — | — | 61 g. |
| Polystyrene Pigment (48% aqueous dispersion) | — | 52 g. | — |
| CMC[1] (3% aqueous solution) | 13.3 g. | 13.3 g. | 13.3 g. |
| Polyvinyl Acetate Latex Binder (47.7% solids) | 51.9 g. | 51.9 g. | 51.9 g. |
| Distilled water | 25.3 g. | 9 g. | — |
| Clay Pigment (70% aqueous dispersion) | 178.6 g. | 142.8 g. | 142.8 g. |
| pH adjusted with concentrated NH$_4$OH to | 9 | 9 | 9 |
| % Solids | 55.4 | 55.7 | 55.2 |

[1]CMC - sodium carboxymethyl cellulose, water soluble, medium viscosity, degree of substitution, about 0.9 - used as a viscosity increasing additive.

Table IV below sets forth the pigment, sodium carboxymethyl cellulose, and binder compositions of the above coating colors.

TABLE IV

| Coating Color | Pigments (parts by weight) Clay | Polystyrene | Particles of Ex. 3 | CMC[1] (parts by weight) | Polyvinyl Acetate Binder (parts by weight) |
|---|---|---|---|---|---|
| 6 | 100 | — | — | 0.3 | 20 |
| 7 | 80 | 20 | — | 0.3 | 20 |
| 8 | 80 | — | 20 | 0.3 | 20 |

[1]Sodium carboxymethyl cellulose - used as a viscosity increasing additive.

Each coating color was applied to the felt side of a 55-lb. paper base stock using a Meyer rod. The coated sheets were dried in a forced-air oven at 100° C. for 45 seconds. In the case of paper coated with Coating Color 6, all tests, except gloss (which was made as shown), were made on coated paper sheets that had been calendered by passing the coated sheets through a heated calender (71° C.) 4 times (4 nips) at 250 pli. In the case of paper coated with Coating Colors 7 and 8, all tests, except gloss (which was made as shown), were made on coated paper sheets that had been calendered by passing the coated sheets through a heated calender (71° C.) 4 times (4 nips) at 250 pli.

ing according to the method of A. B. Loebel (Official Digest, 200, February, 1959).

EXAMPLE 7

A water-jacketed, two-liter resin kettle, fitted with a

TABLE V

| Coating Color | Coat Weight (lb/3000 ft[2]) | Opacity[1] | Brightness | | 75° Specular Gloss[4] Calendered, 250 pli, 71° C. | | | Ink Set-Off (density)[5] | | | IGT Pick Feet per Minute[6] |
|---|---|---|---|---|---|---|---|---|---|---|---|
| | | | Original[2] | K&N[3] | after 2 nips | after 3 nips | after 4 nips | 30 sec | 60 sec | 90 sec | |
| 6 | 7.1 | 88.4 | 74.4 | 49.7 | 57 | 60 | 63 | 0.9 | 0.8 | 0.6 | 561 |
| 7 | 6.5 | 88.3 | 76.1 | 49.3 | 68 | 71 | 74 | 0.8 | 0.6 | 0.5 | 525 |
| 8 | 7.2 | 88.2 | 75.3 | 48.4 | 70 | 71 | 73 | 0.6 | 0.4 | 0.4 | 570 |

[1]TAPPI Standard T-425, Hunter Opacity Meter (Average of 5 tests)
[2]TAPPI Standard T-452 (Average of 6 tests)
[3]TAPPI Standard UM-553 (Average of 2 tests)
[4]TAPPI Standard T-480 (Average of 12 tests)
[5]See (7) of Table II (Average of 3 tests)
[6]See (9) of Table II (Average of 3 tests)

EXAMPLE 5

A 10% solution of a water-soluble prepolymer was prepared by dissolving 43.7 grams of poly(acrylamide) in 393.1 grams distilled water. The poly(acrylamide) had an RSV of 0.45 (1 M NaCl, 1%, 25° C.).

A water-jacketed, one-liter resin kettle was fitted with a stirrer, a thermometer, a condenser and three addition funnels. The kettle was charged with 108.8 grams of the prepolymer solution and 986 grams distilled water. One funnel was charged with 436 grams styrene, the second funnel was charged with 328 grams of the prepolymer solution, and the third funnel was charged with a solution of 12 grams of $(NH_4)_2S_2O_8$ dissolved in 48.4 grams distilled water. The kettle contents were heated to 85°–86° C. (under a blanket of nitrogen) by recirculating hot water in the jacket. The contents of each funnel were added, dropwise, to the kettle over a period of two hours. Additional catalyst, 1 gram of $(NH_4)_2S_2O_8$ dissolved in 4 grams of distilled water was added to the resin kettle to complete the polymerization. The resulting latex, after filtering through a 100 mesh screen, had a solids content of 25.6% and the particles in the latex had a particle size in the range of 0.5 to 0.8 micron. Particle size was measured by Transmission Electron Microscopy.

EXAMPLE 6

A water-jacketed, one-liter resin kettle was fitted with a stirrer, a thermometer, a condenser and two addition funnels. The kettle was charged with 1854 grams of a prepolymer solution and 3685 grams distilled water. The prepolymer solution was an aqueous solution of a 97.5% acrylamide-2.5% acrylic acid copolymer. The solution contained 10% by weight of the prepolymer and the prepolymer had an RSV of 0.39 (1 M NaCl, 1%, 25° C.). One funnel was charged with 3532 grams styrene and 176.6 grams of divinylbenzene. The second funnel was charged with a solution of 97.4 grams ammonium persulfate dissolved in 390 grams distilled water. The kettle contents were heated to about 92°–94° C. under a nitrogen blanket. The contents of each of the two funnels were added, dropwise, to the kettle over a period of four hours. The latex was stirred for fifteen minutes after these additions were complete and then filtered through a 100 mesh screen. The latex had a solids content of 40%. Particle size was about 0.7 micron. Particle size was estimated from turbidity readcondenser, two thermometers, two addition funnels, a burette, nitrogen inlet and mechanical stirrer was charged with 986 grams distilled water, 108.8 grams of a 10% aqueous solution of poly(acrylamide) having an RSV of 0.45 (1 M NaCl, 1%, 25° C.). One funnel was charged with 328 grams of a 10% aqueous solution of a poly(acrylamide) having the same RSV as above; the second funnel was charged with 436 grams styrene; and the burette was charged with a solution of 12 grams of ammonium persulfate dissolved in 48.4 grams distilled water.

The contents of the kettle were heated to 85° C. by recirculating hot water through the jacket. The contents of the two funnels and the burette were added, dropwise, to the kettle over a period of two hours. An exotherm was observed after about 90 minutes and was easily controlled by cooling. After the addition was completed, the prepared latex was stirred for 15 minutes. A slight styrene odor was detected and one gram of ammonium persulfate dissolved in 4 grams of distilled water was added to complete the polymerization.

The latex was filtered through a 100 mesh sieve. The recovered latex had a solids content of 25.6%. The latex was concentrated to 38.4% solids content. The particles in the latex had a particle size in the range of 0.5–0.8 micron as measured by the Coulter Counter.

The above latex was reacted with glyoxal as follows: 599 grams of the 38.4% solids content latex was placed into a reaction flask and the pH thereof adjusted from 1.6 to 9.0 with 50 cc. of 1 M NaOH. 85.5 grams from a 40% aqueous solution of glyoxal was added giving a pH of 5.7. The pH was readjusted to 8.8 with 1 M NaOH. Sufficient water was added to the reaction mass to give 29.7% reaction solids. The latex was stirred for 55 minutes at which time a noticeable increase in viscosity was observed. The pH was adjusted from 7.9 to 3.0 with 2 cc. of concentrated hydrochloric acid.

EXAMPLE 8

A 97.5% acrylamide-2.5% acrylic acid copolymer was prepared. The copolymer had an RSV of 0.34 (0.1 M NaCl, 1%, 25° C.). A water-jacketed, two-liter resin kettle fitted as in Example 7 was charged with 217 grams distilled water and 108.8 grams of a 10% aqueous solution of the above copolymer. One funnel was charged with 218 grams styrene and the other funnel was charged with 5.7 grams ammonium persulfate dissolved in 23 grams distilled water. The contents of the kettle were heated to 86° C. by recirculating hot water through the jacket. The contents of the two funnels were added, dropwise, over a period of 2.5 hours. An exotherm was observed after about 1.75 hours which was easily controlled by cooling. The prepared latex was filtered through a 100 mesh screen. The latex had a solids content of 41.1%. The particles had a particle size of 0.64 micron. Particle size was estimated from turbidity reading according to the method of A. B. Loebel (Official Digest, 200, February, 1959).

EXAMPLE 9

A latex was prepared in accordance with the method of Example 8 except that the copolymer used was a 90% acrylamide-10% acrylic acid copolymer having an RSV of 0.44 (0.1 M NaCl, 1%, 25° C.). The latex had a solids content of 41.1%. The particles had a particle size of 0.62 determined in the same manner as in Example 8.

EXAMPLE 10

264.1 grams of the latex of Example 8 was admixed with 49.2 grams of a 40% aqueous solution of glyoxal (19.7 grams glyoxal). The resulting aqueous solution had a solids content of 41%.

EXAMPLE 11

249 grams of the latex of Example 9 was admixed with 42.5 grams of a 40% aqueous solution of glyoxal (17.1 grams glyoxal). The resulting aqueous solution had a solids content of 41%.

EXAMPLE 12

Four coating colors were prepared. These coating colors are identified as Coating Colors 9, 10, 11, and 12. These coating colors were prepared by thoroughly admixing the components shown in Table VI. pH adjustments are also shown in the Table. Each coating color was applied to the felt side of a 55-lb. paper base stock using a Meyer rod. The coated sheets were dried in a forced-air oven at 100° C. for 45 seconds. The coated sheets were calendered by passing through a heated calender (71° C.) at 750 pounds per linear inch (pli). Gloss determinations, shown in Table VII, were made on sheets passed through the calender 2 times (2 nips), 3 times (2 nips), and 4 times (4 nips). In the case of paper coated with Coating Color 10, all other tests were made after passing the coated sheets through the calender 4 times (4 nips). In the case of paper coated with Coating Colors 9 and 12, all other tests were made after passing the coated sheets through the calender 3 times (3 nips). In the case of paper coated with Coating Color 11, all other tests were made after passing the coated sheets through the calender 2 times. The test results are set forth in Table VII.

TABLE VI

| Coating Color | 9 | 10 | 11 | 12 |
|---|---|---|---|---|
| Example 10 latex composition | 61g. | — | — | — |
| Example 11 latex composition | — | 61 g. | — | — |
| Polystyrene Pigment (48% aqueous dispersion) | — | — | — | 52g. |
| CMC[1] (3% aqueous solution) | 13.3g. | 13.3g. | 13.3g. | 13.3g. |
| Polyvinyl Acetate Latex Binder (47.7% solids) | 52.4g. | 52.4g. | 52.4g. | 52.4g. |
| Distilled Water | 2.1g. | 2.1g. | 27.3g. | 11.1g. |
| Clay Pigment (70% aqueous dispersion) | 142.8g. | 142.8g. | 178.6g. | 142.8g. |
| Inital pH | 3.6 | 3.7 | 4.8 | 5.0 |
| pH adjusted with concentrated NH$_4$OH to | 9.0 | 9.0 | 9.0 | 9.0 |

[1]CMC - sodium carboxymethyl cellulose, water soluble, medium viscosity, degree of substitution - about 0.9, used as a viscosity increasing additive.

TABLE VII

| Coating Color | Coat Weight (lb/3000 ft$^2$) | 75° Specular Gloss[1] at 71° C. 750 pli | | | IGT Pick[2] Feet per Minute | Ink set-off (density)[3] | | | Brightness[4] | Opacity[5] | K&N Ink[6] |
|---|---|---|---|---|---|---|---|---|---|---|---|
| | | 2 nips | 3 nips | 4 nips | | 30 sec | 60 sec | 90 sec | | | |
| 9 | 7.4 | 70 | 71 | 73 | 482 | 0.55 | 0.45 | 0.39 | 74.6 | 89.8 | 48.6 |
| 10 | 7.5 | 63 | 66 | 69 | 299 | 0.71 | 0.60 | 0.47 | 73.7 | 89.3 | 47.8 |
| 11 | 6.7 | 60 | 61 | 61 | 299 | 0.82 | 0.72 | 0.67 | 75.8 | 90.4 | 49.8 |
| 12 | 7.1 | 71 | 71 | 75 | 323 | 0.78 | 0.58 | 0.50 | 76.5 | 91.1 | 49.1 |

[1]TAPPI Standard T-480 (Average of 12 tests)
[2]See (9) of Table II (Average of 3 tests)
[3]See (7) of Table II (Average of 3 tests)
[4]TAPPI Standard T-452 (Average of 6 tests)
[5]TAPPI Standard T-425, Hunter Opacity Meter (Average of 5 tests)
[6]TAPPI Standard UM-553 (Average of 2 tests)

EXAMPLE 13

A water-jacketed, one-liter resin kettle was fitted with a stirrer, a thermometer, a condenser and three addition funnels. The kettle was charged with 2.5 grams water-soluble sodium carboxymethyl cellulose, low viscosity, degree of substitution about 0.7, and 300 grams distilled water. The funnels were charged with 250 grams styrene, 2.4 grams sodium formaldehyde sulfoxylate in 50 grams distilled water, and 3.4 grams 70% tertiary-butyl hydroperoxide in 50 grams distilled water. The kettle contents were heated to 73° C. by recirculating hot water in the jacket. To the kettle were added 10% of the styrene and 20% each of the catalyst solutions. When there was evidence of latex formation (about 10 minutes), the remainder of the funnel contents were added, dropwise, over a period of three hours. The yield was 566.7 grams of a white latex containing 38.5% solids. The product had a 60 r.p.m. Brookfield viscosity of 370 cps. and an average particle size (method of Loebel, Official Digest, 200, February, 1959) of 0.35 micron.

EXAMPLE 14

A water-jacketed, one-liter resin kettle was fitted with a stirrer, a thermometer, a condenser and three addition funnels. One funnel was charged with a solution of 90 grams of acrylamide dissolved in 360 grams of distilled water, the second funnel was charged with a solution of 10 grams of acrylic acid in 40 grams of distilled water, and the third funnel was charged with 3.75 grams of ammonium persulfate dissolved in 71 grams of distilled water. The resin kettle was charged with 195 grams distilled water and heated to 86°–89° C. under nitrogen sparge. The contents of the three funnels were added, dropwise, to the resin kettle over a period of 2 hours, followed by heating the reaction mass at 88.5°–90° C. for 15 minutes. The copolymer solution was cooled to room temperature. The RSV of the copolymer was 0.38 (1 M NaCl, 1%, 25° C.). The total solids was 14.2%. This prepolymer was diluted with distilled water to 10 solids content.

A water-jacketed, two-liter resin kettle was fitted with a stirrer, a thermometer, a condenser and two addition funnels. The kettle was charged with 108.8 grams of the above 10% prepolymer solution and 217 grams distilled water. One funnel was charged with 218 grams of styrene and the other with 5.7 grams of ammonium persulfate dissolved in 23 grams of distilled water. The kettle contents were heated to 86.5° C. by circulating hot water through the jacket. The contents of the two funnels were added, dropwise, to the resin kettle over a period of 2½ hours. After addition was complete, the contents of the resin kettle were stirred for 15 minutes at 88°–90° C., followed by cooling to room temperature. The resulting latex was filtered through a 100 mesh sieve. No grit was isolated. The resultant latex had a solids content of 41.5% and a particle size of 0.7 micron (method of Loebel, Official Digest, 200, February, 1959).

EXAMPLE 15

A portion of the latex prepared in Example 14 was treated with glyoxal as follows: 180.8 grams of the latex was placed into a beaker. Glyoxal, 12.6 grams of a 40% aqueous solution (5.02 grams glyoxal) was added. The resultant pH was 1.8 and total solids were 41.4%. Reaction with glyoxal was carried out by taking 100 grams of the above latex-glyoxal mixture, adjusting the pH from 1.8 to 8–8.5 with 5 M NaOH, stirring for 15 minutes, diluting to 10% solids and adjusting the pH to about 2 with concentrated sulfuric acid.

EXAMPLE 16

The compositions of Examples 14 and 15 were evaluted as fillers for paper. Handsheets were prepared on a Noble & Wood handsheet apparatus. The pulp consisted of a 50:50 blend of bleached hardwood:bleached softwood pulps beaten to a Canadiam Standard Freeness of 500 cc. The paper was made at a pH of 4.5 (1% alum). The latexes were evaluted at addition levels of 4% and 8% (dry basis) using 0.05% of a high molecular weight cationic polyacrylamide as a retention aid. The results of testing of the paper are summarized in Table VIII below. The test results given are the average of the test results obtained on 4 sheets of paper.

Table VIII

| Filler | Basis Weight (lb./3000 sq.ft.) | Dry Tensile Strength (lb./in.) | Mullen Burst (psi) | Opacity[1] |
|---|---|---|---|---|
| Ex. 14 (4%) | 41.5 | 19.2 | 31.8 | 86.3 |
| (8%) | 42.1 | 18.1 | 26.8 | 88.2 |
| Ex. 15 (4%) | 41.8 | 18.3 | 32.5 | 86.4 |
| (8%) | 42.6 | 18.2 | 29.0 | 88.4 |

[1]TAPPI Standard T-425 (Hunter Opacity Meter)

EXAMPLE 17

The apparatus used in these examples consisted of a 2-liter jacketed reaction vessel fitted with a 5-neck head, a condenser, two thermometers, a mechanical stirrer, a pressure equalized addition funnel and a buret for catalyst delivery.

The reaction vessel was charged with 218 cc. distilled water and 114.5 grams of a prepolymer solution. The prepolymer solution was an aqueous solution of a 97.5% acrylamide—2.5% acrylic acid copolymer. The solution contained 10% by weight of the prepolymer and the prepolymer had an RSV of 0.40 (1 M NaCl, 1%, 25° C.). The resulting solution was heated, with agitation, to 85°–87° C. Styrene (218 grams) and diallyl phthalate (10.9 grams) were mixed and placed into the addition funnel. The contents of this funnel and a solution of ammonium persulfate (6 grams dissolved in 24 cc. distilled water) were added, dropwise, to the contents of the reaction vessel simultaneously over a period of 2.5 hours. An exotherm was observed after about 1.75 hours and was controlled by circulating cool water through the jacket. After the addition was complete, the resulting latex was stirred for 15 minutes and cooled to room temperature. The latex, after filtering through a 100-mesh screen, showed slight aggregation which was dissipated easily with a Cowles dissolver. The pH of the latex was adjusted to 5.2 with 5 M NaOH. The latex had a solids content of 41.6% and the particles in the latex had a particle size of about 0.8 micron. Particle size was estimated from turbidity reading according to the method of A. B. Leobel (Official Digest, 200, February, 1959).

EXAMPLES 18–27

Example 17 was repeated using the same prepolymer as used in Example 17 with different polyethylenically unsaturated monomers as crosslinkers as shown in Table IX below. Ingredient amounts and conditions are also shown in the table.

TABLE IX

| Ex. No. | Water (cc) | Grams of Prepolymer[a] | Styrene (grams) | Crosslinker Compound | Amount (grams) | Ammonium Persulfate[b] (grams) | Temp. °C. | Time Hrs. | pH of Latex Adjusted to | Total Solids % | Particle Size[d] microns |
|---|---|---|---|---|---|---|---|---|---|---|---|
| 18 | 227 | 11.3 | 218 | Ethylene glycol dimethacrylate | 8.7 | 5.95 | 87–91 | 2.9 | 5.2 | 39.0 | 0.83 |
| 19 | 226 | 11.2 | 218 | 1,3-butylene glycol dimethacrylate | 6.54 | 5.9 | 86.5–95 | 2.5 | 5.5 | 40.3 | 0.77 |
| 20 | 1226 | 11.2 | 218 | Diallyl phthalate | 6.54 | 5.9 | 86–94 | 2.4 | 5.7 | 41.3 | 0.7 |
| 21 | 226 | 11.2 | 218 | 1,6-hexanediol dimethacrylate | 6.54 | 5.9 | 86–95 | 2.5 | 5.4 | 40.3 | 0.72 |
| 22 | 226 | 11.2 | 218 | Polyethylene glycol dimeth- | 6.54 | 5.9 | 87–95 | 2.5 | 5.2 | 40.2 | 0.68 |

TABLE IX-continued

| Ex. No. | Water (cc) | Grams of Prepolymer[a] | Styrene (grams) | Crosslinker Compound | Crosslinker Amount (grams) | Ammonium Persulfate[b] (grams) | Temp. °C. | Time Hrs. | pH of Latex Adjusted to | Total Solids % | Particle Size[d] microns |
|---|---|---|---|---|---|---|---|---|---|---|---|
| 23 | 226 | 11.2 | 218 | acrylated Polypropylene glycol dimethacrylate | 6.54 | 5.9 | 87–95 | 2.5 | 5.6 | 40.0 | 0.73 |
| 24 | 227 | 11.45 | 218 | Trimethylol propane trimethacrylate | 10.9 | 6 | 87–94.5 | 2.5 | 6.9 | 39.9 | 0.76 |
| 25 | 227 | 11.45 | 218 | Pentaerythritol tetracrylate | 10.9 | 6 | 87–90.5 | 2.5 | 6.9 | 38.1 | 1.0 |
| 26 | 227 | 11.45 | 218 | Diallyl fumarate | 10.9 | 6 | 87–95 | 2.5 | 7.1 | 40.8 | 0.72 |
| 27 | 227 | 11.45 | 218 | Diallyl maleate | 10.9 | 6 | 87–94 | 2.5 | 7.0 | 40.8 | 0.73 |

[a] Added as 10% solution
[b] Added as 20% solution
[c] Adjusted with 5 M NaOH
[d] Determined from turbidity reading (see Example 3)

EXAMPLE 28

A reaction vessel was charged with 506.2 kilograms of demineralized water and 175.2 kilograms of a prepolymer solution. The prepolymer solution was an aqueous solution of a 97.5% acrylamide-2.5% acrylic acid copolymer. The solution contained 13% by weight of the prepolymer and the prepolymer had an RSV of 0.44 (1 M NaCl, 1%, 25° C.). The contents of the reaction vessel were heated to about 89° C. and there were added slowly and simultaneously, over a period of about 4 hours, (1) a mixture of 431.3 kilograms of styrene and 22.7 kilograms of divinylbenzene, and (2) a solution of 12 kilograms ammonium persulfate dissolved in 48.1 kilograms demineralized water. The resulting latex was stirred and filtered to remove agglomerates. The latex had a solids content of 39.3%. Particle size was about 0.52 micron as estimated from turbidity reading according to the method of A. B. Loebel (Official Digest, 200, February, 1959).

EXAMPLE 29

Two coating colors were prepared. The coating colors are identified as Coating Colors 13 and 14. The coating colors were prepared by thoroughly admixing the components shown in Table X. pH adjustments are also shown in the table. Each coating color was applied to the felt side of a 55-lb. paper base stock using a Meyer rod. The coated sheets were dried in a forced-air oven at 100° C. for 45 seconds. The coated sheets were calendered by passing them through a heated calender (71° C.) at 750 pounds per linear inch (pli). Gloss determinations, shown in Table XI, were made on sheets passed through the calender 2 times (2 nips), 3 times (3 nips), and 4 times (4 nips). In the case of paper coated with Coating Color 13, all other tests were made after passing the coated sheets through the calender 2 times (2 nips). In the case of paper coated with Coating Color 14, all other tests were made after passing the coated sheets through the calender 4 times (4 nips). Test results are shown in Table XI below.

TABLE X

| Coating Color | 13 | 14 |
|---|---|---|
| Example 28 latex composition | 63.6 g. | — |
| CMC[1] (3% aqueous solution) | 13.3 g. | 13.3 g. |
| Styrene-butadiene Latex Binder (50% solids) | 50.0 g. | 52.3 g. |
| Distilled Water | 19.5 g. | 45 g. |
| Clay Pigment (70% aqueous dispersion) | 142.8 g. | 178.6 g. |
| Initial pH | 5.85 | 6.0 |
| pH adjusted with concentrated NH4OH | 8.5 | 8.6 |

[1] CMC - sodium carboxymethyl cellulose, water soluble, medium viscosity, degree of substitution - about 0.9, used as a viscosity increasing additive.

TABLE XI

| Coating Color | Coat Weight (lb/3000 ft²) | 75° Specular Gloss[1] at 71° C. 750 pli | | | IGT Pick[2] Feet per Minute | Brightness[3] | Opacity[4] | K&N Ink[5] |
|---|---|---|---|---|---|---|---|---|
| | | 2 nips | 3 nips | 4 nips | | | | |
| 13 | 7.0 | 71 | 74 | 76 | 170 | 80 | 89 | 64 |
| 14 | 7.2 | 66 | 69 | 72 | 174 | 78 | 88 | 71 |

[1] TAPPI Standard T-480 (Average of 12 tests)
[2] See (9) of Table II (Average of 3 tests)
[3] TAPPI Standard T-452 (Average of 4 tests)
[4] TAPPI Standard T-425, Diano Instrument (Average of 4 tests)
[5] TAPPI Standard UM-553 (Average of 2 tests)

While the organic pigments of this invention have particular utility in paper coatings, they can also be used as paper fillers. When used as pigments in paper coatings, they can be used alone or in combination with other organic pigments or in combination with inorganic pigments or in combination with inorganic pigments and other organic pigments.

When used in paper coatings in combination with inorganic pigments such as clay, the amount employed will be from about 5% to 100% of the weight of the inorganic pigment.

Furthermore, the organic pigments of this invention can be used in paints, inks, and the like. They can also be applied as coatings, together with a suitable binder, to glass surfaces, metal surfaces, wood surfaces, plaster surfaces, plastic surfaces and the like.

The organic pigments prepared in accordance with this invention are essentially spherical graft copolymer particles. In accordance with this invention, graft copolymer particles can be prepared that will have a particle size in the range of about 0.1 micron to about 2 microns.

Particularly suitable water-soluble prepolymers for use in preparing the graft copolymer particles of this invention are (1) the homopolymers of α,β-ethylenically unsaturated amides, particularly poly(acrylamide) and poly(methacrylamide), and (2) copolymers of, by weight, (a) from about 98% to about 50% of an α,β-ethylenically unsaturated amide, particularly acrylamide and methacrylamide, and (b) from about 2 to about 50% of an α,β-ethylenically unsaturated acid, particularly acrylic acid and methacrylic acid. Graft copolymer particles that are particularly suitable as organic pigments, either as fillers for paper or as a component of a paper coating composition, are those derived by the graft copolymerization of styrene or a mixture of styrene and divinylbenzene and a homopolymer (1) or copolymer (2) above described. Also, those graft copolymer particles having reactive groups, as hereinbefore described, on the surface thereof are particularly suitable for use as organic pigments.

Binders employed to prepare the coating compositions of this invention will be non-solvents for the organic pigment and are adapted for use in paper coating processes to provide an adherent, smooth, glossy layer. Suitable binders are well known in the art and include the natural binders and synthetic binders. Suitable natural binders include starch, soybean protein and casein. Modified starch binders such as oxidized, enzyme converted, and hydroxyethylated starch can be used. Suitable synthetic binders are styrenebutadiene copolymer latexes and the latexes of polymers of alkyl esters of α,β-ethylenically unsaturated carboxylic acids such as the alkyl acrylates and methacrylates and copolymers thereof with a small amount of a copolymerized ethylenically unsaturated carboxylic acid. Other suitable binders are the latexes of copolymers of butadiene and acrylonitrile; latexes of copolymers of vinyl acetate and the alkyl acrylates; latexes of copolymers of butadiene and methyl methacrylate; latexes of copolymers of vinyl chloride and vinylidene chloride; latexes of vinyl chloride copolymers; latexes of vinylidene chloride copolymers; aqueous dispersions of polybutadiene; polyvinyl acetate; and polyvinyl alcohol.

The amount of binder employed in preparing coating compositions for use in carrying out this invention is that amount which binds the pigment component thereof to the coated paper substrate such that the pigment is not removed from the coated paper during normal handling or during further processing such as printing. The amount of binder employed is within the skill of the art. Usually, the amount of binder employed will be, by volume, from about 2 parts to about 30 parts for 100 parts of pigment employed.

It is to be understood that the above description and working examples are illustrative of this invention and not in limitation thereof.

What I claim and desire to protect by Letters Patent is:

1. A coated paper comprising a paper substrate having adhered to at least one surface thereof a coating composition comprised of a binder material and an organic pigment, said organic pigment being water-insoluble graft copolymer particles consisting essentially of the free radical catalyzed graft copolymerization product of (1) at least one ethylenically unsaturated monomer and (2) a water-soluble prepolymer having an RSV of about 0.1 to about 2.5 (1 M NaCl, 1%, 25° C.), the prepolymer moiety of the graft copolymer particles being present on the surface of the particles, said monomer (1) being selected from the group consisting of methyl alpha-chloroacrylate, ethyl alpha-chloroacrylate, methyl methacrylate, isopropyl methacrylate, phenyl methacrylate, vinyl chloride, acrylonitrile, methacrylonitrile, and monomers having the formula

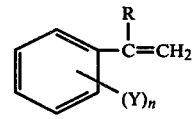

wherein R is hydrogen or methyl, Y is methyl or chlorine, and n is 0, 1, 2, or 3, and said prepolymer (2) being selected from the group consisting of anionic prepolymers and nonionic prepolymers prepared by the addition polymerization of a vinyl monomer or mixtures of vinyl monomers, the amount of prepolymer (2) employed in preparing the graft copolymer particles being from about 1 part to about 25 parts by weight for each 100 parts by weight of monomer (1) employed, said graft copolymer having a Tg equal to or greater than 75° C.

2. The coated paper of claim 1 wherein said prepolymer (2) has an RSV of from about 0.1 to about 1 (1 M NaCl, 1%, 25° C.) and is selected from the group consisting of poly(acrylamide), poly(methacrylamide), copolymers of, by weight, (a) from about 98% to about 50% of an amide selected from the group consisting of acrylamide and methacrylamide and (b) from about 2% to about 50% of an acid selected from the group consisting of acrylic acid and methacrylic acid.

3. The coated paper of claim 2 wherein monomer (1) is styrene.

4. The coated paper of claim 3 wherein there is employed in combination with the styrene a polyethylenically unsaturated monomer in an amount at least sufficient to provide cross-linked graft copolymer particles.

5. The coated paper of claim 4 wherein the polyethylenically unsaturated monomer is divinylbenzene.

6. The coated paper of claim 3 wherein the prepolymer (2) is poly(acrylamide).

7. The coated paper of claim 3 wherein the prepolymer (2) is a copolymer of from about 98% to about 50% acrylamide and from about 2% to about 50% acrylic acid.

8. The coated paper of claim 2 wherein the prepolymer moiety of the particles has chemically bonded thereto an aldehyde.

9. The coated paper of claim 3 wherein the prepolymer moiety of the particles has chemically bonded thereto an aldehyde.

10. The coated paper of claim 4 wherein the prepolymer moiety of the particles has chemically bonded thereto an aldehyde.

11. The coated paper of claim 5 wherein the prepolymer moiety of the particles has chemically bonded thereto an aldehyde.

12. The coated paper of claim 6 wherein the prepolymer moiety of the particles has chemically bonded thereto an aldehyde.

13. The coated paper of claim 7 wherein the prepolymer moiety of the particles has chemically bonded thereto an aldehyde.

14. A paper product comprised of cellulosic fibers and an organic pigment, the organic pigment being essentially uniformly dispersed throughout the paper product by way of internal addition to an aqueous dispersion of the cellulosic fibers prior to product formation, said organic pigment being water-insoluble graft copolymer particles consisting essentially of the free radical catalyzed graft copolymerization product of (1) at least one ethylenically unsaturated monomer and (2) a water-soluble prepolymer having an RSV of about 0.1 to about 2.5 (1 M NaCl, 1%, 25° C.), the prepolymer moiety of the graft copolymer particles being present on the surface of the particles, said monomer (1) being selected from the group consisting of methyl alpha-chloroacrylate, ethyl alpha-chloroacrylate, methyl methacrylate, isopropyl methacrylate, phenyl methacrylate, vinyl chloride, acrylonitrile, methacrylonitrile, and monomers having the formula

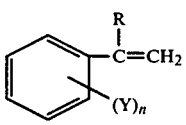

wherein R is hydrogen or methyl, Y is methyl or chlorine, and n is 0, 1, 2, or 3, and said prepolymer (2) being selected from the group consisting of anionic prepolymers and nonionic prepolymers prepared by the addition polymerization of a vinyl monomer or mixtures of vinyl monomers, the amount of prepolymer (2) employed in preparing the graft copolymer particles being from about 1 part to about 25 parts by weight for each 100 parts by weight of monomer (1) employed, said graft copolymer having a Tg equal to or greater than 75° C.

15. The paper product of claim 14 wherein said prepolymer (2) has an RSV of from about 0.1 to about 1 (1 M NaCl, 1%, 25° C.) and is selected from the group consisting of poly(acrylamide), poly(methacrylamide), copolymers of, by weight, (a) from about 98% to about 50% of an amide selected from the group consisting of acrylamide and methacrylamide and (b) from about 2% to about 50% of an acid selected from the group consisting of acrylic acid and methacrylic acid.

16. The paper product of claim 15 wherein monomer (1) is styrene.

17. The paper product of claim 16 wherein there is employed in combination with the styrene a polyethylenically unsaturated monomer in an amount at least sufficient to provide cross-linked graft copolymer particles.

18. The paper product of claim 17 wherein the polyethylenically unsaturated monomer is divinylbenzene.

19. The paper product of claim 16 wherein the prepolymer (2) is poly(acrylamide).

20. The paper product of claim 16 wherein the prepolymer (2) is a copolymer of from about 98% to about 50% acrylamide and from about 2% to about 50% acrylic acid.

21. The paper product of claim 15 wherein the prepolymer moiety of the particles has chemically bonded thereto an aldehyde.

22. The paper product of claim 16 wherein the prepolymer moiety of the particles has chemically bonded thereto an aldehyde.

23. The paper product of claim 17 wherein the prepolymer moiety of the particles has chemically bonded thereto an aldehyde.

24. The paper product of claim 18 wherein the prepolymer moiety of the particles has chemically bonded thereto an aldehyde.

25. The paper product of claim 19 wherein the prepolymer moiety of the particles has chemically bonded thereto an aldehyde.

26. The paper product of claim 20 wherein the prepolymer moiety of the particles has chemically bonded thereto an aldehyde.

* * * * *